Jan. 30, 1951   C. G. HOLLAND-MARTIN ET AL   2,539,998
CARD SELECTING APPARATUS

Filed May 18, 1949   7 Sheets-Sheet 1

Fig.1.

INVENTORS
A.W.BOWYER
BY C.G.HOLLAND-MARTIN

C.E.McTiernan
AGENT

Jan. 30, 1951  C. G. HOLLAND-MARTIN ET AL  2,539,998
CARD SELECTING APPARATUS
Filed May 18, 1949  7 Sheets-Sheet 3

INVENTORS
A. W. BOWYER
BY C. G. HOLLAND-MARTIN
AGENT

Jan. 30, 1951  C. G. HOLLAND-MARTIN ET AL  2,539,998
CARD SELECTING APPARATUS
Filed May 18, 1949 7 Sheets-Sheet 4

INVENTORS
A. W. BOWYER
C. G. HOLLAND-MARTIN
BY C. E. McTiernan
AGENT.

Patented Jan. 30, 1951

2,539,998

UNITED STATES PATENT OFFICE 2,539,998

CARD SELECTING APPARATUS

Cyril G. Holland-Martin, Wallington, near Baldock, and Aldred W. Bowyer, Letchworth, England, assignors to International Business Machines Corporation, New York, N. Y., a corporation of New York Application May 18, 1949, Serial No. 93,864
In Great Britain November 3, 1947

15 Claims. (Cl. 209—110)

This invention relates to methods of searching for data bearing record cards in accordance with the data recorded in a plurality of columns, similar data not being confined to fixed fields on the card. The invention has especial application to cards employing a combinational code in respect of each column.

Cards may have data registered thereon in a large number of ways, including punching, marking, embossing and magnetizing. For convenience they will be uniformly referred to as punched cards.

When feeding cards in the normal manner, e. g. a "Hollerith" 80-column card, the card to be sorted or selected is sensed index point by index point and not column by column, so that a fixed pattern of data can be selected only from known columns, e. g. a card punched with holes in numeric code could be selected by plugging or otherwise setting the required numeric values into a comparison device, and applying the output from the particular column or columns to this comparison device, e. g. a "76" in columns 44 and 45 could be searched for in one run.

The object of the present invention is to enable the search of a pack of record cards for all those cards bearing certain data in a plurality of columns, in a group of adjacent columns, or in two groups each group comprising adjacent columns, the arrangement of columns or sequence of groups not being fixed; and on finding the wanted card or cards to select in known manner as for instance by offsetting the wanted cards in relation to the pack, or sorting them into a separate pocket, or reproducing data therefrom in known manner as for instance by a punch, an interpreter or a print unit.

It is a further object to make the machine as flexible as possible so as to deal with many different forms of search.

The invention therefore may be applied to the searching for subject matter in patents where the inventions have been recorded with the integers of the invention not in fixed fields. A given integer might occupy several columns and by reason of the presence of other integers, differing from patent to patent, a given integer would vary in position from card to card.

Another application of the invention is in connection with chemical data coded after the manner set forth in G. Malcom Dyson's book "A New Notation and Numerical System for Organic Compounds," published in 1947 by Longmans, Green and Company of New York. In this code the composition of a chemical is described in terms of letters, numerals and a certain number of symbols such as commas, full stops, and brackets. A given chemical feature so recorded may therefore appear in different columns for different chemicals. Furthermore, numerals are utilized to indicate not only how many atoms, but also to which positions an atom is attached in the molecule. Hence in searching it may be necessary to ignore i. e. skip certain numerals in a sequence.

According to the invention, a record controlled machine for searching for data contained in unknown columns has card feeding means, data sensing means by which the data is presented to a search unit column by column in succession, a search unit, card selecting or data reproducing means, the search unit having means for comparing a first chain of data registering and normally set connections such that if the comparison indicates agreement, another chain of data registering and manually set connections for comparison with a subsequent column is brought into operation.

It is preferred to feed the card endwise and sense column by column whilst the card is in motion, but the card may equally be fed broadside and be sensed in all positions whilst at rest, and the columns read out sequentially.

The search unit essentially compares a card column reading with a manual setting and if alike (thus indicating that the required data for that column has been found) a circuit is completed so as to bring into operation a further comparison device, and so on until the required pattern has been found. If a part pattern is found and the next column is not as wanted, then the circuits break. It is also possible to search for a sequence amongst repetitive patterns, i. e. ABAC can be found in a pattern ABABAC. By an alteration of plugging, provision may be made for searching for items recorded in a sequence broken by an unknown number of columns containing only data of a particular kind, which can be skipped by arranging that the circuits set up by previous columns are maintained.

It is preferred to employ electromagnetic relays for the comparison i. e. search device as this leads to less costly equipment and greater flexibility, but valve means are also described, employing the same principles, having however less flexibility but the virtue of greater speed than the relays.

By way of example, the invention will be described as applied to a card selecting machine. With reference to the accompanying drawings, Figs. 1, 2, 3, 4, and 7a, show one form of the invention employing a relay search unit. The other figures show a modification of the search unit employing thermionic valves.

In the drawings:

Fig. 3 is a circuit diagram of the search unit, employing relays.

Figure 1:
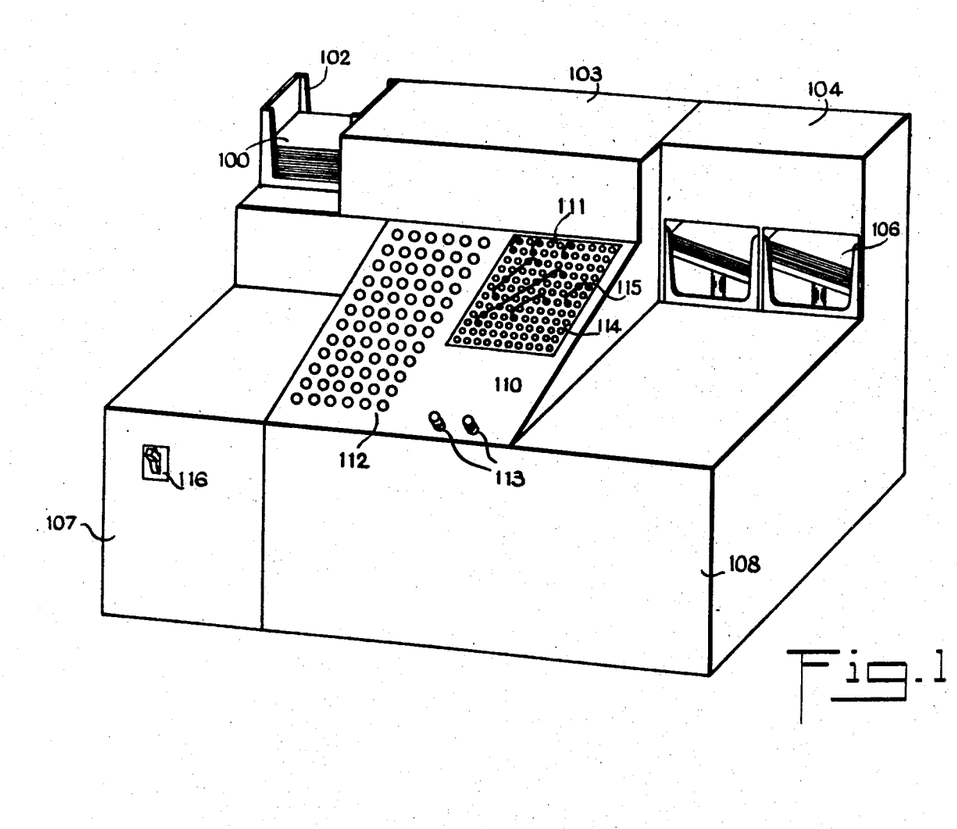
Fig. 1 is a front view of the complete machine embodying the principles of the invention.

The general view of the machine shows it to consist of a cabinet, divided into two sections 107 and 108, above which is a sloping control panel 110 and the card handling and sensing mechanisms. The left hand section of the cabinet, shown as 107, contains the driving motor and the machine control circuits and the supply switch 116. The right hand section 108 contains the search unit, and in the case of the valve form of the invention suitable power supplies for the valves. The control panel 110 carries the series of switches 112 which form the manually settable connections in the search unit and in addition, a plugboard 111 to which various connections in the search unit are brought out to enable a particular operation program to be set up, the appropriate plug points 114 being connected by wires 115. Two push buttons 113 control the stop and start circuits.

The card handling mechanism for the cards 100 consists of the hopper 102, feed rolls and sensing mechanism beneath the covers 103 and 104 and two receiving pockets 106 to contain respectively the selected cards and the rejected cards.

*Card handling and sensing mechanism*

Figure 2:
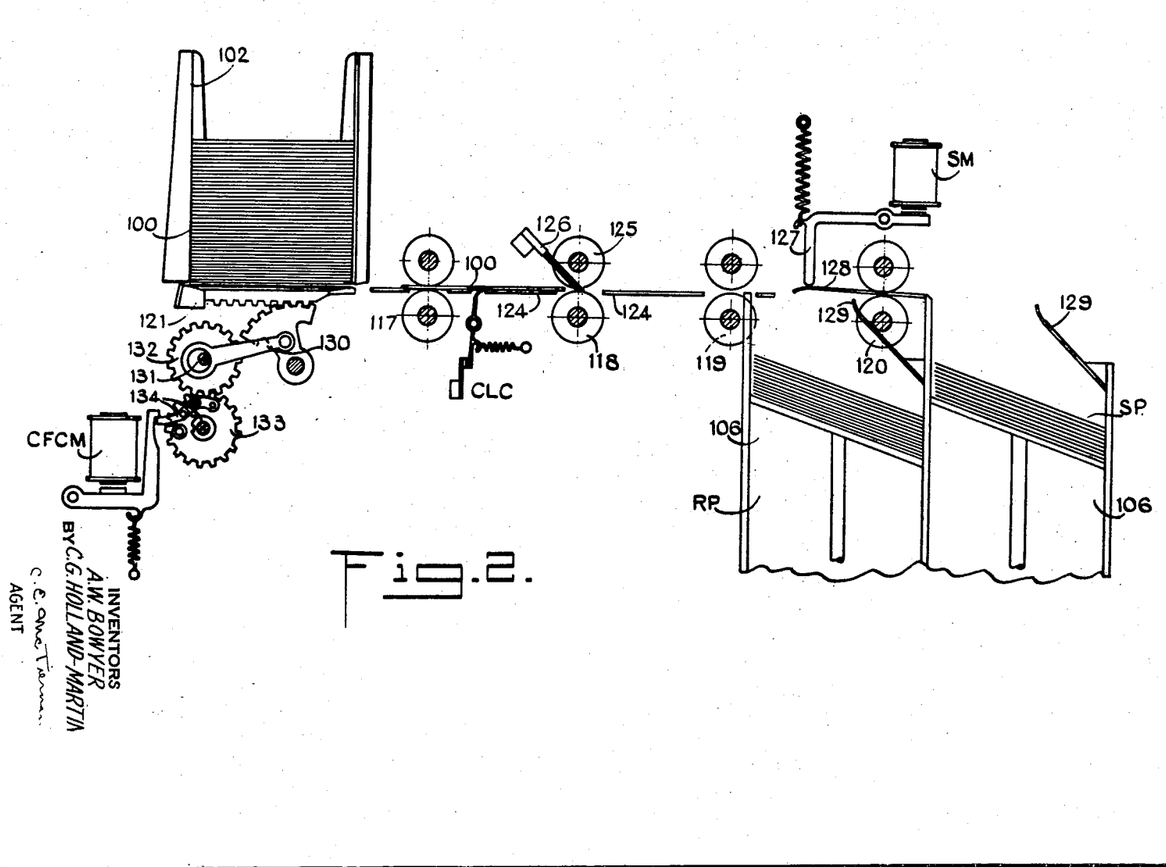
Fig. 2 is a schematic view of the card handling and sensing mechanism.

In Fig. 2 there is shown a schematic view of the card handling and sensing mechanisms. The machine is arranged for handling the well known 80 column cards, with 12 index points per column having data recorded by punched holes.

The cards are fed lengthwise from the hopper 102 by a picker knife 121. The picker knife is caused to reciprocate to feed the cards forward, by a well known mechanism diagrammatically shown as a rack and sector wheel, which is driven by a link 130 from an eccentric mounting 131. The eccentric is mounted on the same shaft as a gear 132 which meshes with a gear 133. The rotation of the gear 133 is controlled by a one-revolution clutch, generally designated 134, which is brought into operation by the card feed clutch magnet CFCM. A series of card feed rolls 117, 118, 119 and 120, are driven continuously from a common shaft geared to the driving motor, shown in Fig. 4. They are each associated with an appropriate non-driven roller. As a card 100 emerges from the hopper through a throat block of well known form it is engaged for driving by the first pair of feed rolls. As it feeds forward, being supported by a card guide 124, it causes an arm to rotate clockwise and close the card lever contacts CLC. The next set of rolls 118 and 125 comprise the card sensing station. Roll 125 is grooved to receive the set of 12 sensing brushes 126, with only one thereof being shown, roll 118 being the contact roll for the brushes. The card after sensing is engaged by the next driven feed roll 119, which normally feeds it into one of the pockets 106, hereinafter to be called the reject pocket RP. A guide 129 attached to the side of the pocket RP serves to direct the card downwards so that it falls freely onto the usual sprung card support. If, however, the magnet SM is energized by the search unit, through circuits to be described, the arm 127 is rotated counterclockwise against the pull of the light retaining spring and depresses the spring strip 128 below the level of the card path. Consequently, the card emerges from the feed roll 119, passes over in lieu of under spring 128 and between it and the arm 127. The end of arm 127 is suitably shaped to prevent damage to the card. The card is then engaged by the driven feed roll 120 for delivery to the second pocket hereinafter called the selected pocket SP.

From the foregoing it will be appreciated that cards placed face down in the hopper will be fed endwise with column 1 leading.

Had the car been fed broadside and all the data sensed by brushes whilst the card was at rest in sensing position, then the data represented by each column can be scanned by an 80 position commutator, and all brushes relating to an index point commoned and connected to the search unit as in the endwise feed example.

*Machine control mechanism*

Figure 4:
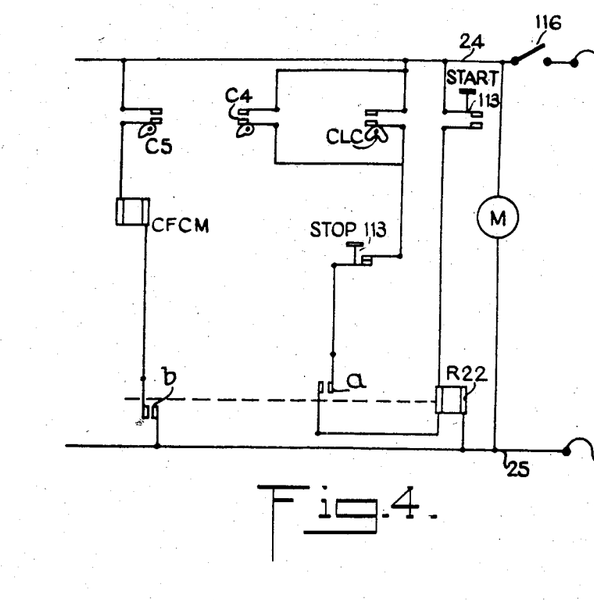
Fig. 4 is a circuit diagram of the machine control circuits.

With reference to Fig. 4, the driving motor M is connected across the main supply lines 24 and 25 through two fuses, and a supply switch 116. This motor serves to drive the card feed mechanism, the feed rolls and also a cam shaft bearing cams C1 to C7, such as shown in Figs. 3 and 4. When the switch 116 is closed the motor starts, thus rotating the feed rolls and the cam shaft. The picker knife drive is under control of the magnet CFCM which has not yet been energized. The start key 113 is depressed, energizing relay R22 which closes its contacts a and b. At the appropriate time in the cycle, a circuit exists from line 24 to line 25 through the cam contact C5, magnet CFCM and contacts b of R22. The energization of magnet CFCM causes operation of the one-revolution clutch 134 as shown in Fig. 2, to feed a card out of the hopper. As the card is fed forward it closes the card lever contact CLC which then provides a hold circuit for the relay R22 from line 24 to line 25 through the contacts CLC, stop key 113 normally closed and contacts a of R22. The contacts CLC are by-passed by the cam contacts C4 during the interval between cards as shown in the timing diagram of Fig. 7a. Consequently, a permanent hold circuit now exists in parallel with the start key 113 which may be released and the machine will now feed cards automatically. When the last card is being sensed, the card lever contacts will be open and will not close again when C4 opens. Consequently, the last card must be run out by once again depressing the start key 113. Depression of the stop key 113 breaks the hold circuit for R22, which drops off, breaking the circuit of magnet CFCM and consequently no further cards are fed from the hopper.

Search unit

Two forms of search unit, one utilizing relays and the other utilizing valves will be described. The embodiment employing relays will first be dealt with and such is shown in Fig. 3.

Figures 7A, 7B:
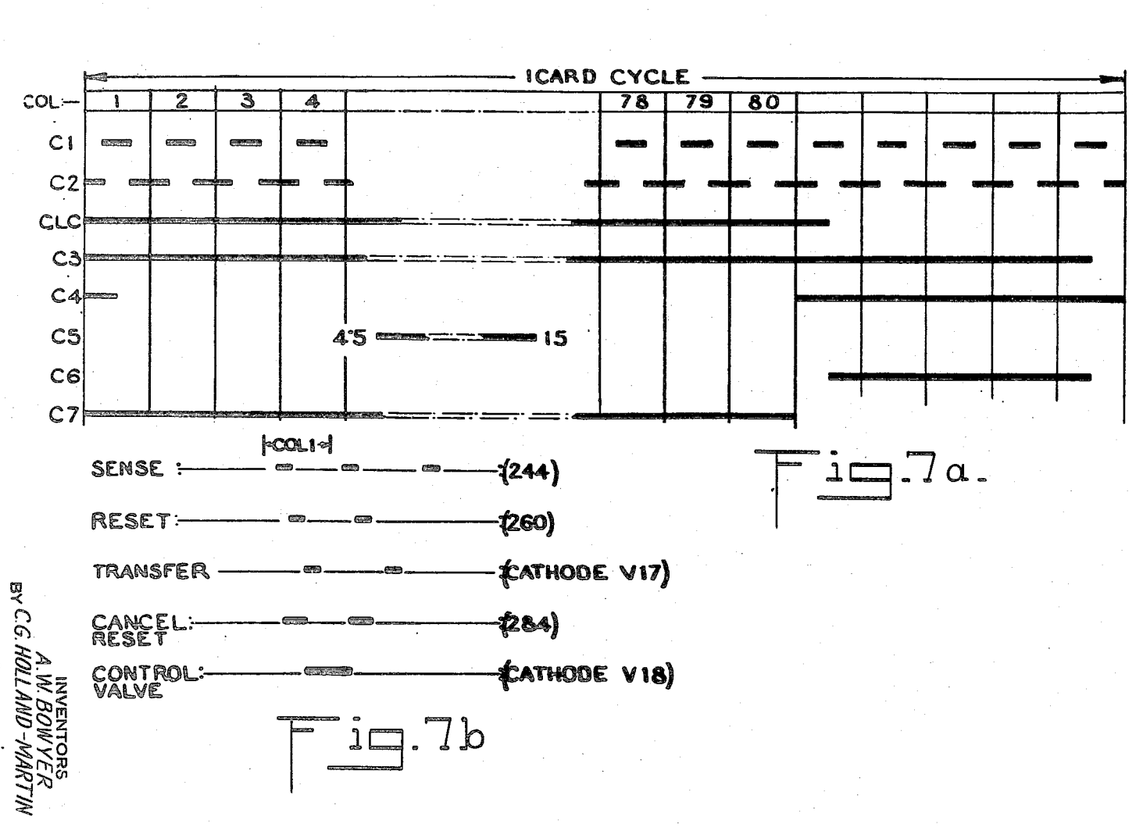
Fig. 7a is the cam timing diagram.
Fig. 7b is a timing diagram showing the relation of the various control pulses.

One side of the supply line 24 is connected through cam contacts C7 and a common brush 20 to the contact roll 118. The twelve sensing brushes 126 also make contact with the contact roll through any hole occurring in the card. Each of the sensing brushes 126 is connected to one of the relays R1 to R12. These relays are connected by a common line 23 to supply line 25 through cam contacts C1. Fig. 7a shows that the cam C1 closes at each column and the cam C7 is closed for the duration of the card sensing period. Thus, if a hole is sensed in, for example, the 10 index point position in a particular column, then a circuit will exist from line 24 through cam contacts C7, brush 20, contact roll 118, 10 index point position brush 126, relay R10, line 23, cam contact C1 to line 25. The relay R10 operates a series of contacts R10a to R10h, which form part of the several comparison chains and also the numeric skip chain.

In the first chain comprising the a contacts of relays R1 to R12 there are also 12 switches 1a to 12a. If it is required to find, for example, a hole punched in the "10" index point position in a card, then the switch 10a is moved to the set position, then on sensing such a column a circuit will be formed from line 24 through R12a, switch 12a, R11a, switch 11a, all in the normal position, R10a (shifted), switch 10a set, the remaining contacts in their normal position, and the pick up coil R16 to line 25. Thus the relay R16 has been energized in consequence of the fact that switch 10a was set and the relay R10 was operated. R16 through its b contacts connects the next chain consisting of the b contacts of the relays R1 to R12 and the b set of switches 1b to 12b to line 24. If the switch 11a had been set, then the circuit in the first chain would have been broken at this point and R16 would not have been energized. Thus a circuit is completed through the chain only if the relays which are operated due to a hole being sensed correspond with the keys which have been set. It is apparent that this holds for any number of keys up to the total of 12 which may be set so that a card punched in any code may be dealt with, provided the appropriate keys are set.

The hold circuit for R16 is through its a contacts and hold coil. By joining socket 31 to any one of a number of other sockets, the time for which relay R16 will hold on may be set to suit the various operations which the machine can perform.

For example, if a connection is made between socket 31 and one of the sockets 26, R16 will hold on until just after the commencement of the next column sensing, since cam contacts C2 break once per column, as shown in the timing diagram of Fig. 7a.

It will now be clear with this plugging of relays R16, R17, R18, R19, R20 that if a pattern of key settings is made in each of the various chains containing the relay contacts a to e, then the chains will be connected to the supply line in succession by the energizing of the transfer relays R16, R17, R18, R19 and R20, if the appropriate data is sensed from the card in successive columns. The relay R20 when energized by the pattern being completed will close its b contact and a circuit will then be completed through R20b, plug wire between sockets 30 and 33 and the pick up coil of R14, and this relay will hold on through its a contacts and the now closed contacts of C3. Immediately after the end of the card sensing time, cam contacts C6 will close, allowing the selector magnet SM to be energized through R14b. Thus the spring 128 in Fig. 2 will be depressed and the card containing the required data will be directed into the appropriate pocket SP.

The independent column search chain comprising relay contacts R1f to R12f and switches 1f to 12f has no transfer relay contact in series with it and, in consequence, may be set up independently of the remainder of the chains. The contacts R21b are wired in series with the magnet R14 so that this chain may be used for searching for a given column, independently of the other chains which may be searching for a particular pattern, and if the sockets 30 and 33 are not joined, then R14 will be energized only if R20 and R21 are both operated. The chain comprising relay contacts 12g, 1g to 11g and 1h to 11h is used when it is required to skip columns containing certain data. If it is operated, then R13 is energized and the contacts R13a short-circuit the hold circuit cam contacts C2 for the sensing interval of a column so that any energized transfer relays remain operated. The exact plugging required will be described in more detail in connection with the examples of operation.

In order to illustrate how various operational programs are set up to enable the machine to carry out various types of searching, a number of examples will now be described. These examples with the exception of the last will be shown in relation to a code suitable for use in recording chemical structure by means of Dr. Dyson's chemical code, allocating index points to express it as follows:

| Index Point | Significance |
| --- | --- |
| Y | ( ). |
| X | Alphabetical. |
| 0 | |
| 1 | |
| 2 | Units. |
| 3 | |
| 4 | |
| 5 | Tens. |
| 6 | |
| 7 | |
| 8 | Comma. |
| 9 | Full stop. |

Combinations of these provide:

| Code | Units |
| --- | --- |
| 0 | 1 |
| 1 | 2 |
| 01 | 3 |
| 2 | 4 |
| 02 | 5 |
| 12 | 6 |
| 012 | 7 |
| 3 | 8 |
| 03 | 9 |

The tens digit is similarly coded, using the index points 4, 5, 6 and 7. The alphabet using both upper and lower case and various special symbols are represented by X, in combination with the digits 1, 2, 3, 4, etc., thus readily giving 99 combinations.

Case I.—Consecutive column searching

Suppose a search be required for all compounds containing a substituted benzene ring as principal ingredient (symbolized by B) and inter alia 1, 3C, 5Q, e. g. xylenol derivatives. The cards will be already filed grouped by reference to B. Hence the search is confined to 1, 3C, 5Q no matter what groups precede or follow it. The punching for 1, 3C, 5Q will be:

08/01/X018/02/X0124 the oblique sign indicating how the punching is divided as between columns. This information is set up in the same sequence on the chains of the search unit as that in which the data is read from the card, i. e. the 0 and 8 switches being set in the first column, the 0 and 1 in the second column and so on. Plug connections are made between the points 31 of chains 1 to 5 and the points 26. A further plug connection is made from 30 to 33. When a card bearing the required data is sensed the following sequence of events occurs.

When the 1, value punched as (08) is sensed, as previously described, the relays R10 and R8 will be energized, closing their contacts in all the chains. A circuit will then exist through the first chain since switches 10 and 8 have already been manually set. Relay R16 will be energized, closing its contacts R16b, but the chain circuit is once more broken by the sensing relays R10 and R8 dropping off by C1 opening before R17 can be operated. R16 will be held on until the beginning of the next column sensing through its hold coil, contacts R16a, plug connection 31—26 and cam contacts C2. The circuit through the other chains even though set to the same setting will not have been completed since the transfer relay contacts R17b, R18b, R19b have not been closed. The next column to be sensed will contain the punching for 3(01). Consequently, the relays 10 and 1 will be energized, and in similar manner as occurred for the previous column relay R17 will be energized and held on until the next column sensing. Thus when the third column is about to be sensed, relay R16 will be deenergized, R17 will be energized and the third chain will be connected to the supply line. In a similar manner, relays R18, R19 and R20 will be energized in succession, each dropping off just after the next chain has been set up. When relay R20 is energized, its b contacts will close and there will be a circuit from line 24, contact R20b plug connection from 30 to 33 and the pick up coil of R14. R14 establishes a hold circuit through its a contacts and the closed cam contacts C3 for the remainder of the sensing period.

After the sensing of this particular card has been completed the magnet SM will be energized through cam contacts C6, now closed, and contacts R14b. Magnet SM will cause depression of the spring strip 128 and the card will be directed into the selected pocket SP.

If instead the card had contained the data B1, 2, 4, 5C, 3N2 (nitro-1, 2, 4, 5 tetra methyl benzene) then the operation would have been as follows:

The first column setting would have been correct for the 1. The next chain, however, would have been set for 3 (01), but the relay for 2, (18), would have been energized. No circuit would have been established through this chain, so that R17 would not have set up and R16 would have dropped off so that the transfer relays would have been deenergized at the end of the second column sensing, indicating that the correct pattern had not been found at this stage of the card sensing, the search continuing with the first chain until the end of the card sensing.

Case II.—Non-consecutive columns

It may be required to search in a particular group of cards for all those containing the symbols B C N in that order. An example of a compound fulfilling this requirement is B1, 2, 4, 5C, 3N2. In other words, the symbols B C N may be separated by any number of columns containing numeric data but not alphabetic. The switches to represent B C N are set in the first, second and third chains respectively and a plug connection is made from 38 of the fourth chain to 33. Points 31 of the first three chains are plugged to points 26. Points 29 of the skip chain are plugged across and from 29 to the upper point 35 of R11h and from lower point 35 of R11h to 36. When the B is sensed relay R16 is energized and held on, putting in the second chain through R16b. Relay R11 operates since the code for B is X1 and consequently the skip chain is broken by contact R11h. When 1 is sensed the second chain is not set up, but the numeric chain is complete since R11 is not operated, R13 is energized and its contacts R13a provide a parallel circuit across the cam contacts C2. Thus the hold circuit for R16 through contacts R16a is not broken during the sensing cycle, R13a contacts being closed during the break time of C2. The first chain is similarly held during the sensing of 2, 4, and 3. The C then sets up the second chain and this chain is held on by the action of R13 over the sensing of 5. The N sets up the third chain, relay R18 is operated, R18b closes and R14 is energized through the plugging from 38 to 33. The operation is then as for Case I.

Case III.—Group and independent column

It may be necessary to search for a group of data in association with a single column of data which occurs in any position. Such an example is searching for the combination of ACQ and N in compounds such as K4, 11–12 AQCN4 and B10, 1–2, 5–6, B4, 8ZN, 17–18 AQCQ. The first four chains are connected up as in Case II, the switches being set to represent ACQ except point 38 of the 4th chain is connected to point 30 and point 31 of the 3rd chain to point 37. The 6th chain is set to represent N and the point 31 of this chain is connected to point 37. When the group ACQ is sensed, the first three chains will set up in the way already described and relay R18 will hold until the end of the sensing period, since contacts C7 do not break until this time. Similarly, the sixth chain will cause energization of R21 when an N is sensed and this relay will likewise also hold on until the end of the sensing period. When both R18 and R21 are energized a circuit exists from line 24, contacts R18b, plug connection from 38 of the fourth chain to point 30, contacts R21b and pick up coil of relay R14, to line 25. Thus, if both ACQ and N are found on the same card, in no matter what relation, the relays R18 and R21 will be energized before or by the end of the card sensing cycle, causing operation of relay R14 and thus of magnet SM as already described.

Case IV.—Repetitive patterns

So far the examples have assumed that the sought information is unique on each card. It may well arise, however, that part of the pattern is repetitive as for example in searching for ZQ4 in K2, 11-12B4, 13ZQ, ZQ4. The plugging and operation are similar to Case II, with the omission of the skip chain, but it may be well to explain in more detail how the operation takes place. Thus the first occurrence of Z will set up the first chain. The Q will set up the second chain after which the first transfer relay will drop off. The second Z will not set up the third chain, so that at the end of that column sensing, the second and third transfer relays will not be energized, but the first chain will have been set up again by the sensing of Z and from then on, the operation will be as described. It will be clear that the false start caused by the presence of the initial ZQ combination has not prevented the search unit from operating successfully on the following correct combination.

Case V.—Two groups alternatively

Clearly two search units may be provided and both adapted for operating a single relay R14. Each search unit will be set up as in Case I, that is each to search for say a group of five data columns, the two groups not being identical. If a connection is made between the points 33 in the two units then if either relay R20 operates, then R14 will be energized. Thus, the card will be selected if it contains either of the required groups of data.

Case VI.—Two groups selectively

In Case III was shown the search unit used to find cards containing both of two sets of data. By replacing the independent column transfer contact R21b by a contact operated by a second search unit and corresponding to R20b, then two groups of data may be searched for quite independently. This requirement may be exemplified by the case of searching simultaneously for both ZQ4N2 and 4N2AQ, when they may occur in cards either separately or overlapping as ZQ4N2AQ for instance.

Case VII.—Partial elimination

It may be desired to search for say all compounds whose coding commences J?.C. where the interrogation mark may be any number which can be punched in a single column. The first two chains have their switches set as though searching for J C in consecutive columns and the third chain plugged so as to operate R14. The fourth chain is plugged from the upper point 28 of R9d to 37, from point 36 to points 26 and switch 9d is set, representing a full stop. When J is sensed relay R16 will be energized bringing in the second chain. In a wanted card some number, together with a full stop will now be sensed. Relay R17 will not be energized since the chain is set for C, a circuit will exist however from line 24, plug connection 37 to 28 upper of R9d, contacts R9d (shifted) switch 9d (set) plug connection from 36 to 26. Since the hold circuit of R16 is plugged to 26 also, the above circuit will provide a hold for R16 whilst contacts C2 are broken. Thus R16 will be held on until the third column sensing, if a C occurs R17 will be energized causing selection of the card. If a C does not occur then R16 will drop off in preparation for any further set up which may occur. The fact that R19 is permanently energized is immaterial since the fifth chain is not being used.

Case VIII.—Partial suppression

In order to search for a compound of the form ?, ?, 13ZN where the interrogation marks stand for any number that can be punched in a single column, it is necessary only to set the chains as /, /, /13/Z/N and plug as in Case I. In addition, in the first chain point 38 is connected to upper point 28 of R8a and lower point 28 of R8a to 36 and similarly for the second chain. Thus these two chains are set up by a , irrespective of the number which accompanies it.

Case IX.—Modified skipping

In certain codes which may be employed, numerals are always represented by a single punching and alphabet and symbols by combinations of two punchings. The search chains will deal with these codes in the same manner as already set forth. The skip chain however requires a modified plugging. The points 29 are joined together, each pair of points 34 and each pair of points 35. By inspection, it will be seen that if one relay only operates, then there will exist a circuit through the chain of contacts and plug wires and relay R13 will be energized. If two relays operate then there is no circuit and relay R13 is not energized. Hence skipping occurs on any single hole punching, i. e. numeric.

A further form of the invention employing thermionic valves instead of relays in the search unit will now be described.

Principles of operation

Figure 6:
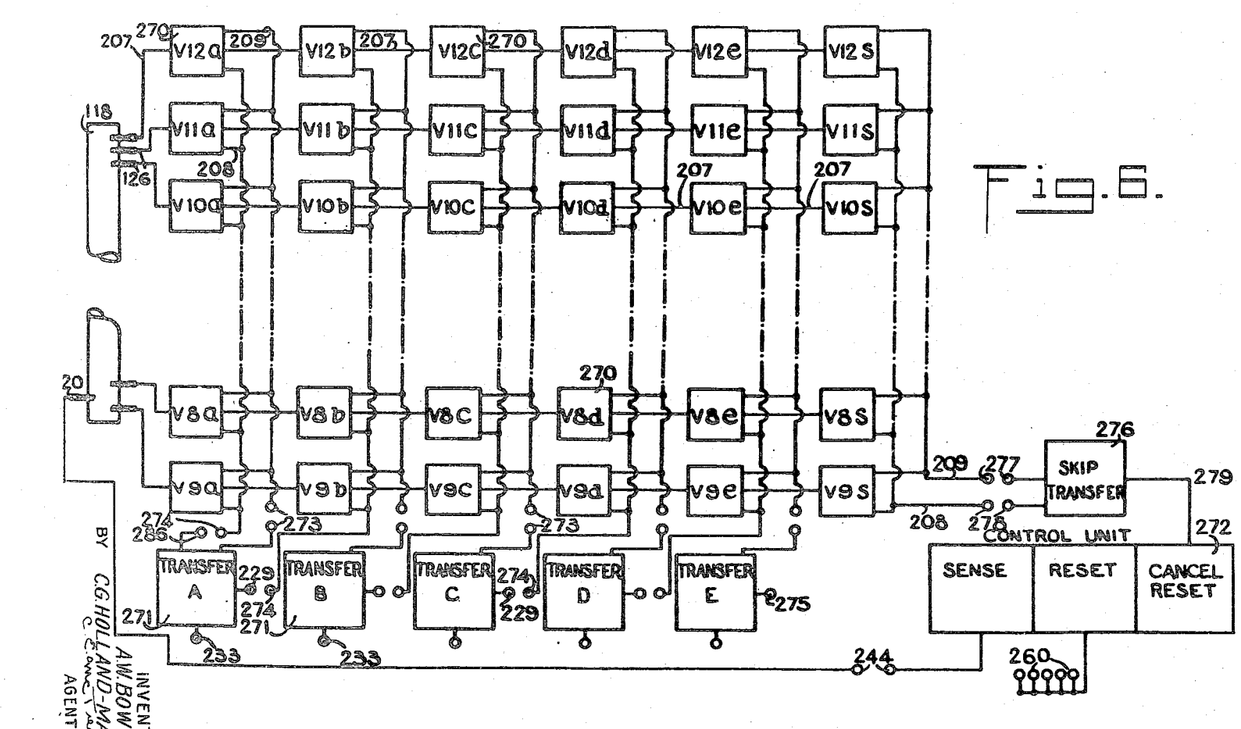
Fig. 6 is a block diagram of the search unit, employing thermionic valves.

Referring to the block diagram, Fig. 6, it is seen that the sensing relay contacts are each replaced by a valve and an associated circuit, block 270, and that blocks V1a to V12a are comparable with a relay contact chain in the relay version. The valves are set by plugs or switches to be conducting or non-conducting and the impulse received from the brushes when a hole is sensed is conveyed by plugs or switches set so as to render a conducting valve non-conducting or a non-conducting valve, conducting. Each brush is associated with a block 270 in each chain. The valves in these blocks 270 are so set by their associated switches that if a card column is sensed having the same combination as that set by the switches, all the valves of the particular chain are rendered non-conducting. This condition of all the valves non-conducting is employed to indicate to the transfer unit that the holes read agree with the switch setting. The transfer unit serves the same purpose as the transfer relays in connecting up to a next chain.

The blocks V1s to V12s comprise a skip chain with an associated skip transfer unit 276. Whereas in the relay embodiment the transfer relays dropped off after each column unless plugged to hold, it is contra in the valve embodiment since the transfer valve V18 remains set unless plugged to "Reset." This valve corresponds to the transfer relay contacts in the next chain. The transfer unit contains more than one valve, and hence it is possible to have the transfer unit with the exception of V18 return to sensing condition without reference to the state of V18.

The electronic search unit is designed for operation at greater speed than the relay search unit, hence the closer timing control required is carried out by valve control unit 272. This is shown in Fig. 6 divided into three sections, Sense, Reset and Cancel Reset.

Valve search chains

Figure 5:
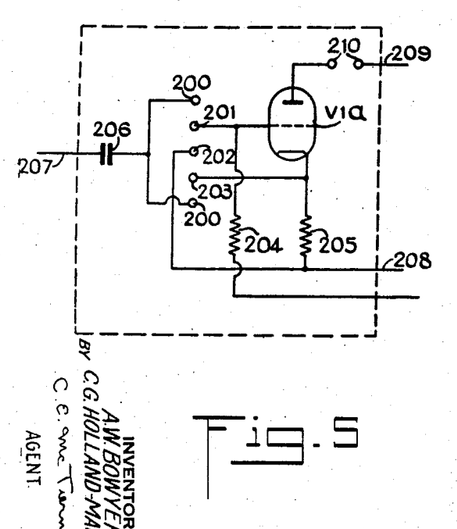
Fig. 5a shows the circuit of one valve of the electronic form of the comparison chain.
Fig. 5b shows the circuit of the electronic transfer unit.
Fig. 5c is the circuit diagram of the electronic control unit.

The circuit of all valves in the search unit chains is identical, apart from the manually set connections, and an example is shown in Fig. 5a.

A number of plug points 200, 201, 202 and 203 enable the valve circuit to be put in a set or unset state. In the unset state connections are made from 201 to 200 and 203 to 202. In addition, a connection is made between the two plug points 210 to supply anode voltage to the valve from the common anode line 209. By this plugging the cathode of V1a is now at the potential of the common cathode line 208 and the grid is connected to a source of voltage negative with respect to line 208 through the resistor 204, the voltage being such that the valve is normally non-conducting. If a positive impulse of sufficient amplitude is applied to the grid from the sensing brushes 126 via the wire 207, condenser 206 and the connection between the plug points 200 and 201, then the valve will become conducting. This valve was in the unset state, i. e. set to represent the absence of a hole in that particular index point position. Thus the valve becoming conducting indicates that a hole has occurred in an incorrect position.

In the converse set up of the valve, connections are made from plug points 201 to 202, and from 203 to 200. The grid of the valve is now at the potential of line 208 and the valve will therefore conduct, the current being limited by the bias potential developed across the cathode resistor 205. A positive sensing impulse is in this case applied to the cathode and will be of sufficient amplitude to raise the cathode potential above the cut off value. Thus the valve will be non-conducting when a hole has been sensed in the correct position. The operation may be summarized thus. If no hole is sensed the valve remains in its normal state. If a hole is sensed, the state of the valve is reversed. The circuit conditions are such that agreement between the setting and the sensed data will always be indicated by valves being non-conducting during the sensing period.

Thus valve V1 of Fig. 5a will be operated as follows:

| Switch setting | Card column | Before sensing | During sensing | Indication |
|---|---|---|---|---|
| No Hole 200–201 202–203 | No Hole | Off | Off | Agreement. |
| Hole 200–203 202–201 | Hole | On | do | Do. |
| No Hole 200–201 202–203 | do | Off | On | Disagreement. |
| Hole 200–203 202–201 | No Hole | On | do | Do. |

If it is not required to sense in a particular index point position in a given chain, the appropriate valve can be rendered inoperative by opening the plug points 210, and thus disconnecting the anode from the common line 209. This corresponds to the plugging which may be made between points 28 in Fig. 3 in order to short out unwanted relay contacts.

The common cathode and anode lines 208, 209 of all the valves in a chain are connected via plug points to the appropriate transfer unit. In addition, there is a common negative line, not shown in Fig. 6, connected to the resistor 204, Fig. 5a.

Transfer unit

Figure 5B:
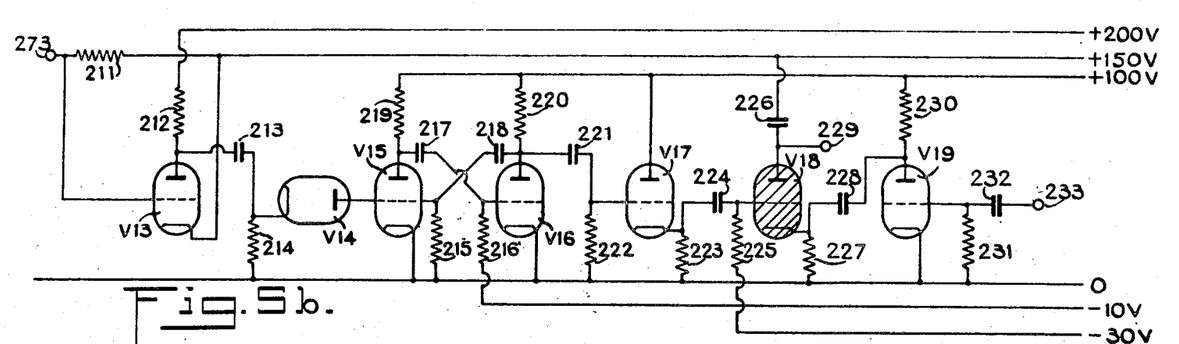

Referring to Fig. 5b, the common line from the anodes of all the valves in a chain is connected via plug points 273 and resistor 211 to an H. I. supply which may conveniently be 150 volts. Thus the anode current of any conducting valve causes a voltage drop across resistor 211 and the potential difference thus caused between the grid and anode of V13 is sufficient to render V13 non-conducting. The set valves will be initially conducting but when the correct combination of holes is sensed, the valves are all rendered non-conducting, the voltage across 211 becomes zero and V13 conducts. A negative pulse appears at the anode of V13 which is transferred through the condenser 213 and the diode V14 to the grid of V15. The diode prevents a positive pulse reaching the grid of V15 when V13 again becomes non-conducting at the end of the sensing pulse, resistor 214 providing a return circuit for the diode.

V15 and V16 form a triggered flip flop of well-known form. The time constants of the combination of resistors 215, 216 and the condensers 217, 218 are chosen to give a delay of the required duration to allow of resetting the transfer valve V18 before the flip flop returns to its stable state. The grid of V16 is connected to a negative supply through resistor 216, so that the normal state of the trigger circuit is with V15 conducting and V16 non-conducting. The negative pulse applied to the grid of valve V15 cuts it off, so that in well-known manner V16 becomes conducting and stays in that state for a time determined by the time constant of the resistor condenser combination. When V16 switches back to non-conducting state, its anode rises rapidly in potential and this delayed rise is fed through a short time constant network of condenser 221 and resistor 222 to the grid of the cathode follower V17. A positive pulse slightly reduced in amplitude appears across the cathode follower load 223. This pulse is of sufficient amplitude to overcome the negative bias supplied to the grid of gas valve V18 through resistor 225. In consequence of the reduction of bias, valve V18 strikes and passes current. It is apparent that when V16 conducts a negative pulse is applied to the grid of V18, but this has no effect, whether V18 is conducting or not as V18 is a gas valve.

The anode of V18 via plug point 229 may be connected to the common cathode line 208 of the search valves in the next chain, so that when it becomes conductive, the potential of line 208 falls to some 30–40 volts positive with respect to the zero potential line, the exact value being determined by the voltage drop across V18 in its conducting state and the cathode resistor 227. Thus approximately 110 v. is now developed between line 208 and the 150 volt supply line as power supply for the chain of search valves, so making them ready for operation by a sensing pulse. A condenser 226 connected between the anode of V18 and the 150 volt supply line serves to ensure firing of the valve when the pulse is applied.

A negative impulse from the control unit may be connected to plug point 233. This produces a large amplitude positive pulse across the anode load 230 of valve V19. This pulse, through condenser 228, drives the cathode of V18 sufficiently positive to reduce the anode-cathode potential below the ionizing value. V18 de-ionizes and is then held non-conducting by the action of the negatively biased control grid. The condenser 226 also aids in de-ionization by introducing a slight delay in the anode voltage rise which would otherwise occur when the cathode of V18 is driven positive.

Thus in effect the transfer valve V18 is controlled for setting by the valve V13 through a time delay network and for resetting by valve V19.

Control unit

Figure 5C:
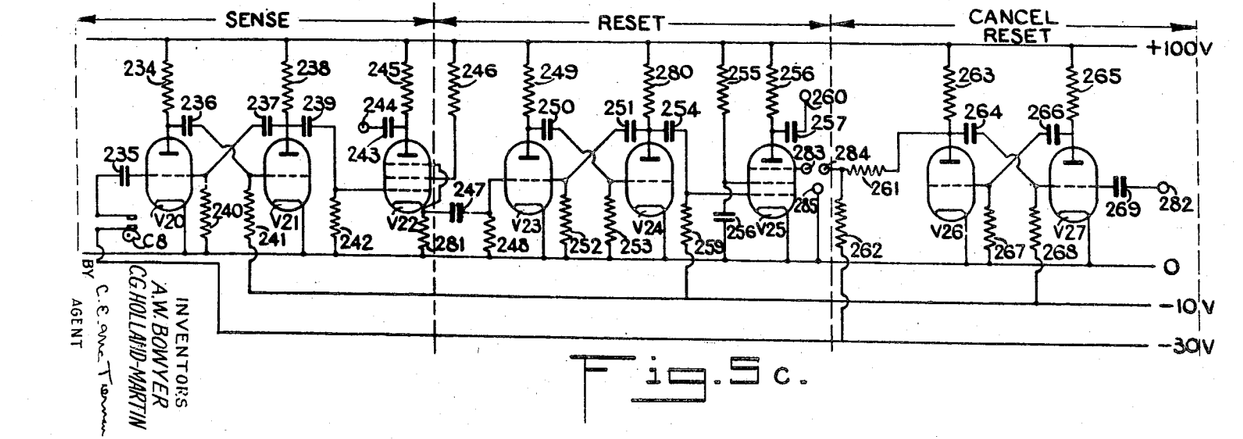

The control unit provides the main timing control for the operation of the search unit and such is shown in Fig. 5c. It may be functionally divided into three units controlling respectively sensing, resetting of the transfer unit and cancellation of the resetting function for such purposes as skipping of columns.

The cam contacts C8 are closed for the same duration as those designated C1 in Fig. 7a. The closing of these contacts causes a negative pulse to be applied to the grid of V20 through condenser 235. Valves V20 and V21 form a trigger flip flop with V20 normally conductive. The negative pulse cuts off V20, causing V21 to become conductive. A negative pulse of a duration determined by the time constants of the trigger circuit is developed across the anode load 238, amplified by valve V22, a positive pulse appearing across the anode load 245. The plug point 244 is connected to the anode of V22 via the condenser 243 and is also connected by plugging to the common brush 20, Fig. 6, to provide a positive sensing impulse at the correct time determined by C8 for each column sensing and of a duration determined by the flip flop and convenient for use in conjunction with the valve search chains.

A negative pulse also appears across the cathode resistor 281 of V22 and is applied to the grid of V23 which forms the normally conducting half of the trigger flip flop V23 and V24. V23 is cut off by the pulse and the consequent conduction of V24 causes its anode to drop in potential. This drop is communicated via the short time constant circuit consisting of condenser 254 and resistor 259 to the grid of V25. Since this valve is normally cut off this pulse has no effect. However, when the trigger flip flop switches back to its normal state, a positive pulse is applied to V25, causing it to conduct and produce a negative pulse at its anode. This delayed pulse may be plugged to the various transfer units to effect resetting as already described. The suppressor grid of V25 is normally maintained at zero potential by connecting plug points 283 and 285, so as to secure automatic reset after every column sensing. If it is desired to prevent resetting of the transfer units then the plug connection is made from point 283 to 284. In the normal state of a further trigger flip flop comprising valves V26 and V27, V26 is conducting and its anode potential is considerably less than the H. T. potential due to the potential drop across anode resistor 263. The point 284 on the potentiometer network 263, 261, 262 is then sufficiently negative in potential to ensure that anode current cannot flow in V25 even when the grid is positively pulsed with the suppressor of V25 connected to point 284. Thus reset pulses are not produced at 260 under these conditions. If a positive pulse is applied to point 282 from the skip transfer unit, then the trigger flip flop V26 and V27 is switched over, the anode potential of V26 rises and the suppressor grid of V25 becomes only slightly negative with respect to the zero potential line and anode current can flow if the grid is pulsed before V26—V27 revert to their stable state.

Skip unit

The valves and associated circuits in the skip chain are each similar to those in the search chain. The skip transfer unit, however, consists only of a valve corresponding to V13 but having a resistor in the cathode lead. The cathode is connected via wire 279, Fig. 6, to point 282, Fig. 5c, and condenser 269 to the grid of V27. Thus when this skip transfer valve starts conducting a positive pulse is conveyed to 282 to operate the cancel reset trigger flip flop V26 and V27.

Timing

The relative timing of the various operating impulses is shown in Fig. 7b. Once the indication of the transfer valve V13 has operated the trigger flip flop V15 and V16 any subsequent operation of the transfer unit is independent of the state of the various chains. Hence it is possible to reset the transfer units other than the trigger flip flop and their associated chains immediately after sensing. After the reset has occurred, any setting necessary as a result of sensing is made by the flip flop returning to normal. Thus in effect the setting is "stored" by the circuit whilst resetting takes place and then the setting is made by triggering of the gas valve V18 by the storing flip flop flopping back to its stable state. It will be appreciated that the reset pulse being generated from the sensing pulse trailing edge cannot begin until after the sensing pulse has ended.

The impulse which is produced by the cancel reset circuit when operated by the skip unit must overlap the reset pulse so as to ensure effectiveness of the reset pulse in V25. The start is timed by being generated from the sensing pulse, the finish by the recovery time of V26 V27 flip flop.

Operation

It will be apparent from the foregoing description that the electronic search shown in block diagram form in Fig. 6 is in most respects similar to the relay form shown in Fig. 3. In consequence, the other features of the machine such as card handling mechanism and control circuits may be identical in the two embodiments.

In view of the similarity of operation it is considered sufficient to describe only one example for the electronic form. Taking Case II of the examples already given the first three chains must be set to represent B C N. This will necessitate plugging the first chain for valves V11a and V9a and V1a connections between 201 and 202, 203 and 200, and for the remaining valves in the chain between 201 and 200, 203 and 202. In the second column valves V11b, V10b, V9b and V1b are connected in the set position and the remainder unset, and correspondingly for the third chain, Fig. 6, valves V11c, V4c, V2c are connected in the set position and the remainder unset.

It will be noted that there are two plugs 274 coming to the first transfer unit, from the first and second chains. The one from the first chain is connected to plug 286 which is connected to the zero potential line through a resistor approximately equal in value to that of the valve V18, in its conducting state, plus its cathode resistor. The second plug 274 is connected to plug 229 and similarly for the third chain. The plug points 273 are connected across for each of the three chains. Points 233 are connected to the plug points 260 to provide for reset. Plug points 244 are connected across to provide for the sensing pulse. The plug 229 for the third transfer unit is connected to relay R14, Fig. 3, in such a way as to cause the relay to operate when V18 becomes conductive. Valve V11s of the skip chain is connected in the set position and the remainder of the valves have their anode connection broken by removal of the plug connection joining the points 210, Fig. 5a. Plug connections are made between the two points 277 and the two points 278. In the control unit a connection is made between points 283 and 284. When B is sensed the set valves in the first chain are all rendered non-conducting, thus operating the transfer unit as already described and switching the second chain by V18 into operation. In addition, V11s is rendered non-conducting, operating the cancel reset circuit to allow a reset pulse to appear at the anode of V25. Since no transfer units are set at this time, this pulse has no effect.

On the following numerals none of the search chains are set up. The skip chain is also inoperative so that the cancel reset circuit is not pulsed and hence is operative to suppress resetting of the first transfer unit. When C is sensed, the second chain is operated to set up the second transfer unit. Prior to this setting up, however, the skip chain has operated the skip transfer unit and allowed a reset pulse to be sent to the transfer units, with the result that the first transfer unit is reset.

Similar action will occur when N is found to set up the third transfer unit thus operating relay R14 and the selection of the card then takes place as already described in previous examples.

Although the valve form of the invention employs the same principles of operation as that using relays, it is clear that the circuits are not identical in every respect and that this form is a little less flexible in the various types of search it may perform, particularly is this so in the case of the skip unit. However, the form of the invention employing valves is particularly advantageous when the unit is required to operate at high speeds.

It is to be understood that as either a valve or a relay are provided for each index point in a column any code can be employed without altering the functioning of the search unit for recording the data to be searched. Likewise it should be understood that the manually settable switches of each index point position within a chain may be combined with the corresponding relay or electron discharge device, as the case may be, as well as being separate elements, to form for each index point position within a chain an integral settable control element. As a result these settable control elements each would have the dual characteristics of being capable of being set for the sensing of a particular index point position and being responsive to the sensing of a perforation within a particular index position. The number of search chains required again depends on the nature of the code and of the data recorded but it will be appreciated that the versatility for searching is greatly increased by the inclusion of a skip chain.

Although the invention has been described by reference to sorting, there are many applications in which it is desirable to retain the cards in their original order and to reproduce the data contained thereon, the indication for such known mechanism to operate upon a particular card being provided by a circuit through the contacts of the search unit output relay R14.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A record controlled machine for searching for data contained in unknown columns, card feeding means, a search unit, sensing means associated with said card feeding means, said sensing means presenting data to said unit column by column in succession, said search unit comprising a plurality of electrical comparison chains, each of said chains having a plurality of relay means interspersed with an equal number of settable switch elements, a transfer relay operably connected to each of said comparison chains, means completing a circuit from one of said chains through the corresponding transfer relay to another chain when the data sensed and the setting of the settable switch elements coincide, a holding circuit, said corresponding transfer relay being held by said circuit as long as certain predetermined classes of data are not found in successive columns whereby columns are skipped.

2. A record controlled machine as claimed in claim 1, in which the search unit has a plurality of independent groups of comparison chains each group being set for a particular pattern, a card selection means, means associated with and controlled by the last of said transfer relays of each of said groups, said last mentioned means being serially connected with said card selection means whereby said card selection means is rendered effective only if the plurality of sought patterns are present.

3. A record controlled machine as claimed in claim 1, in which the search unit has a plurality of independent groups of comparison chains with each group being set for a particular arrangement of data, a card selection means, means associated with and controlled by the last of said transfer relays of each of said groups, said last mentioned means being operably coupled with said card selection means in such a manner as to render said card selection means effective if any of the particular arrangements are present.

4. A record controlled machine for searching for data in unknown columns, comprising card feeding means, a search unit, sensing means by which the data is presented to the search unit column by column in succession, a card selecting means, said search unit comprising a plurality of electrical comparison chains, each of said chains comprising a plurality of electronic discharge devices and associated settable means each equal in number to the number of index points represented by said chain, a source of operating potential, said settable means controlling the application of said potential to the corresponding one of said devices, said devices in a chain being set by the corresponding one of said settable means for a particular pattern when in a conducting condition, said set devices being rendered non-conducting when the data entered by a column sensing and the data represented by the set connections coincide, a thermionic device conducting when all of said devices are rendered non-conductive, an electronic transfer unit coupled to said thermionic device and the following chain, said device upon becoming conductive rendering said transfer unit operable, said transfer unit causing the following chain to be made effective whereby the card selection means becomes actuated.

5. A record controlled machine for searching for data in unknown columns, comprising means for successively feeding data bearing record cards, means for sensing said cards, a search unit comprising a plurality of electrical comparison chains, the number of chains being equal in number to the columns containing the data sought for, each of said chains comprising a plurality of relays equal in number to the number of index points in a card column and a plurality of manually settable connections set pursuant to the data sought interspersed with said relays, each of said chains including a transfer relay operably associated therewith, said sensing means presenting the data sensed to said relays column by column in succession, certain of said transfer relays upon being energized being operatively coupled to the next following chain so that when the data read in a column and the manually settable connections are in agreement, a circuit is completed through the chain associated with said column thus energizing the corresponding transfer relay and placing the following chain in condition for a comparing operation.

6. A record controlled machine as in claim 5, in which said plurality of comparison chains are sequentially operated, card selecting means, relay means for controlling the operation of said card selecting means upon being made effective, the last of said chains being operably coupled to said relay means, said last chain rendering said relay means effective and causing the operation of said card selecting means when agreement is reached between said manually settable connections and the data read in all of said chains.

7. In a record controlled machine for searching for data contained in unknown columns recorded on a card comprising card feeding means, data sensing means, a search unit comprising a plurality of electrical comparison chains, said comparison chains having manually set connections, one or more transfer relay means operably connected to each of said chains, said sensing means presenting the data sensed to said chains column by column in succession, certain of said relay means of each of said chains upon being made effective controlling the operation of the next following chain, said relay means being made effective when the data read in a column and the manually set connections coincide, card selecting means, said transfer relay means of the last of said chains operably coupled to said card selecting means, a source of operating potential, said potential being applied to said card selecting means only when agreement is found in all chains in the data read in a column and the manually set connections.

8. In a record controlled machine as claimed in claim 7, in which the search unit comprises two groups of comparison chains, each group being set independently of the other, the transfer relay means of the last chain of each of said groups being coupled to said card selection means, said card selection means being rendered effective when agreement is found between the data read in a column and said set connections in any one of said chains.

9. In a record controlled machine as claimed in claim 7, in which the search unit comprises two groups of comparison chains, each group being set independently of the other, the transfer relay means of the last of said chains of each of said groups being operably coupled to said card selecting means, said groups being simultaneously operated upon by the data read in, said source of potential being applied to said card selection means when either of said transfer relay means of the last of said chains of each of said groups becomes effective.

10. A record controlled machine as claimed in claim 4 in which said transfer unit comprises a multivibrator circuit having a normal condition of stability, said device upsetting said stability by means of a pulse, means restoring said multivibrator to its original status before the sensing of the next column.

11. A record controlled machine as claimed in claim 10, wherein the multivibrator circuit upon being restored to the normal position releases a pulse signal, a non-conductive gas discharge device, said signal energizing said gas discharge device whereby a source of voltage is applied to the next comparison chain, said gas discharge device being automatically restored to the original position at the end of each column.

12. A record controlled machine as claimed in claim 11, wherein column skipping is obtained by means of an impulse applied so as to prevent the automatic restoration of said gas discharge device.

13. In a record controlled machine as defined in claim 7, including circuit holding means coupled to the transfer relays of each of said comparison chains, said holding means retaining said transfer relays in an energized state until the transfer relay of the following chain becomes energized, means rendering said holding means ineffective when said following transfer relay becomes energized whereby the preceding transfer relay is returned to an unenergized state thereby placing the comparison chain associated therewith in a comparing condition.

14. A record controlled machine for searching for data contained in unknown columns, comprising means for successively feeding record cards, means for sensing said cards, a search unit, said unit including a plurality of electrical comparison chains, each of said chains having a plurality of settable control elements, there being one of said elements for each index point in a column, said sensing means presenting the data sensed to said elements, means coupled to certain ones of said chains for transferring the output signal of each respective chain to the next following chain, said signal being transferred to the next subsequent chain when the data entered by a column sensing and the data represented by the settable connections coincide, card selecting means, means coupling the last of said chains to said card selecting means, said card selecting means being made effective when all of said chains indicate agreement.

15. A record controlled machine for searching for data contained in unknown columns, card feeding means, means for sensing said cards, a search unit including a plurality of electrical comparison chains, each of said chains having a plurality of settable control devices, there being one of said elements for each index point in a column, said sensing means presenting the data sensed to said devices, pulse transfer means coupled to each of said chains, certain of said transfer means coupling the associated chain with the next following chain when the data entered by a column sensing and the data represented by the settable connections agree, card selection means, said transfer means of the last of said chains coupled to said card selection means, said card selection means becoming effective when agreement is found in all of said chains.

C. G. HOLLAND-MARTIN.
A. W. BOWYER.

REFERENCES CITED

The following references are of record in the file of this patent:

UNITED STATES PATENTS

| Number | Name | Date |
|---|---|---|
| 2,265,439 | Maul | Dec. 9, 1941 |

FOREIGN PATENTS

| Number | Country | Date |
|---|---|---|
| 256,223 | Great Britain | Sept. 1, 1927 |